F. MESINGER.
SADDLE FOR MOTOR CYCLES.
APPLICATION FILED JAN. 31, 1912.
1,036,877.
Patented Aug. 27, 1912.
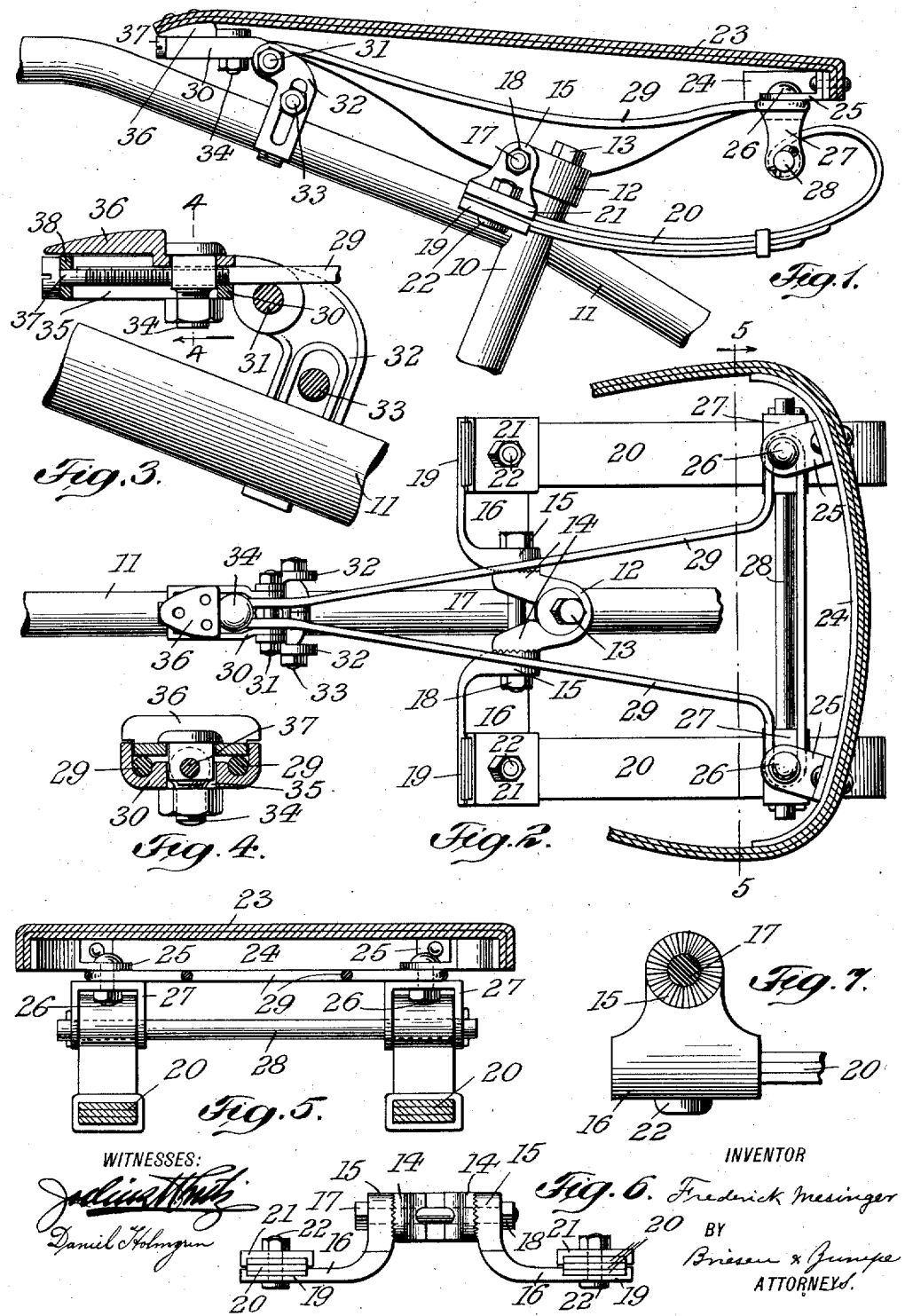

UNITED STATES PATENT OFFICE.

FREDERICK MESINGER, OF NEW YORK, N. Y.

SADDLE FOR MOTOR-CYCLES.

1,036,877.   Specification of Letters Patent.   Patented Aug. 27, 1912.

Application filed January 31, 1912. Serial No. 674,463.

*To all whom it may concern:*

Be it known that I, FREDERICK MESINGER, a citizen of the United States, residing at New York city, county and State of New York, have invented a new and Improved Saddle for Motor-Cycles, of which the following is a specification.

This invention relates to an improved saddle more particularly adapted for motor cycles and which is supported at a minimum elevation above the frame, so that the rider's feet may readily reach the ground. The saddle possesses great resiliency and may be easily fitted in position and adjusted.

In the accompanying drawing: Figure 1 is a side elevation partly in section of a saddle embodying my invention; Fig. 2 a plan with the saddle top removed; Fig. 3 a detail of the nose piece and adjoining parts: Fig. 4 a cross section on line 4—4, Fig. 3; Fig. 5 a cross section on line 5—5, Fig. 2; Fig. 6 a front view of the post clamp and adjoining parts, and Fig. 7 a detail of one of the movable clamp-members.

The saddle post 10 of a cycle frame 11 is straddled by a clamp 12 resting on a shoulder of said post and secured in position by bolt 13. The drawing shows the clamp fitted to an upright post, while with a goose neck post, it is turned at right angles as will be readily understood. The clamp is made in the form of a yoke, and both of its shanks are provided on their outer faces with a plurality of radial grooves to constitute a pair of relatively fixed circular friction jaws 14. These jaws are engaged by correspondingly grooved relatively movable jaws 15 formed on the upwardly turned ends of a pair of longitudinally alined arms or members 16. A bolt 17 passing through a central aperture formed in each of the four jaws pivotally connects the arms to the yoke, while by slackening a nut 18 on the bolt, the arms may be swung farther backward or forward to adjust the height of the saddle. Each arm 16 is provided at its outer end with a recessed seat 19 adapted to receive the forward end of a flat cradle spring 20 which is secured to the arm by a flanged cap 21 and a bolt 22 that passes through the arm, cap and spring. Springs 20 are composed preferably at their front of a plurality of leaves which gradually diminish in number toward the back, where but a single leaf may be provided. The rear end of each spring 20 is bow-shaped as shown and secured to the back of the saddle top 23 in manner now to be described.

The saddle top is provided at its back with a depending flange to the inner face of which there is attached a curved cantle 24. This cantle is provided with a pair of forwardly extending apertured lugs 25 from which depend a pair of bolts 26. These bolts carry at their lower ends a pair of yokes 27, each of said yokes being adapted for the reception of the rear end of one of the cradle springs 20. The rear eye-shaped ends of these springs encompass a pin 28 passing through both of the yokes which thus constitute bearings for said pin. It will be seen that by the means described the cradle springs may be readily fitted in position and that the height of the saddle may be regulated by setting the members 16 farther backward or forward on their pivot 17. The stay spring 29 of the saddle is bent at its rear end to extend back of both bolts 26 above yokes 27 for which purpose a clearance is formed between such yokes and lugs 25 of cantle 24. The two forward ends of the stay spring are seated within a grooved plate 30 pivoted by bolt 31 to a pair of slotted L-shaped brackets 32 adjustably secured to frame 11 by bolt 33. To plate 30 there is secured by an apertured bolt 34 passing through a slot 35 of plate 30, a nose piece 36 to which the front of the saddle top 23 is attached. A screw 37 engages an apertured front flange 38 of plate 30 and is tapped into bolt 34, so that by manipulating the screw, the nose piece may be retracted or advanced to correspondingly slacken or tighten the saddle top.

It will be seen that the saddle constructed as described is readily adjustable, that it possesses great resiliency and that it is mounted at a minimum elevation above the saddle post, so that the rider's feet may reach the ground whenever occasion may demand.

I claim:

1. A saddle provided with a post clamp, a pair of arms extending laterally therefrom and having seats at their outer ends, a pair of flat cradle springs engaging said seats at their forward ends, bolts passing through said springs and arms, a saddle top and means for securing the rear ends of said springs to said top.

2. A saddle provided with a post clamp, a pair of arms extending laterally therefrom and having seats at their outer ends, means for adjustably securing said arms to said clamp, a pair of flat cradle springs engaging said seats at their forward ends, bolts passing through said springs and arms, a saddle top and means for securing the rear ends of said springs to said top.

3. A saddle provided with a saddle top, a cantle secured thereto, a pair of yokes depending from the cantle, a pair of cradle springs extending into the yokes with their rear ends, and means for securing said ends to said yokes.

4. A saddle provided with a saddle top, a cantle secured thereto, a pair of bolts depending from the cantle, a pair of bearings carried by the bolts, a pin hung in said bearings, a pair of cradle springs, and means for securing said springs to said pin.

5. A saddle provided with a saddle top, a cantle secured thereto, a pair of bolts depending from the cantle, a pair of yokes carried by the bolts, a pin hung in the yokes and a pair of cradle springs encompassed by the yokes and coiled around the pin.

6. A saddle provided with a saddle top, a cantle secured thereto, a pair of bolts depending from the cantle, a pair of bearings suspended from the bolts at a distance from the cantle, a pin hung in said bearings, a stay spring engaging the bolts intermediate cantle and bearings, and a pair of cradle springs secured to the pin.

7. A saddle provided with a post clamp, a pair of arms pivotally connected thereto, means for locking the arms to said clamp, a saddle top, a cantle carried thereby, a pair of yokes depending from the cantle, a pin traversing the yokes, and a pair of cradle springs connected to the arms at their forward ends and to the pin at their rear ends.

8. A saddle provided with a post clamp, a pair of members adjustably secured thereto, a saddle top, a pair of bolts depending therefrom, bearings carried by the bolts, a pin hung in the bearings, a pair of cradle springs secured to the adjustable members and to the pin at their front and rear ends respectively, a stay spring engaging the bolts, and means for adjustably securing said stay spring to the front of the saddle top.

FREDERICK MESINGER.

Witnesses:
AUGUST ERB,
HENRY H. MESINGER.

---

Copies of this patent may be obtained for five cents each, by addressing the "Commissioner of Patents, Washington, D. C."